United States Patent
Hyslop

(10) Patent No.: US 11,375,385 B2
(45) Date of Patent: Jun. 28, 2022

(54) VIRTUAL CONCENTRIC CELLS BASED ON ACTIVE ANTENNAS IN A WIRELESS COMMUNICATION SYSTEM

(71) Applicant: SMARTSKY NETWORKS LLC, Charlotte, NC (US)

(72) Inventor: Douglas Hyslop, Vienna, VA (US)

(73) Assignee: SmartSky Networks, LLC, Apex, NC (US)

( * ) Notice: Subject to any disclaimer, the term of this patent is extended or adjusted under 35 U.S.C. 154(b) by 45 days.

(21) Appl. No.: 16/888,967

(22) Filed: Jun. 1, 2020

(65) Prior Publication Data

US 2020/0296601 A1  Sep. 17, 2020

Related U.S. Application Data

(63) Continuation of application No. 16/302,715, filed as application No. PCT/US2017/033499 on May 19, 2017, now Pat. No. 10,708,791.

(Continued)

(51) Int. Cl.
*H04W 16/28* (2009.01)
*H04B 7/185* (2006.01)
(Continued)

(52) U.S. Cl.
CPC ......... *H04W 16/28* (2013.01); *H04B 7/18506* (2013.01); *H04W 16/30* (2013.01); *H04W 88/08* (2013.01)

(58) Field of Classification Search
CPC ... H04W 16/28; H04W 16/30; H04W 88/085; H04B 7/04; H04B 7/0617; H04B 7/18506
See application file for complete search history.

(56) References Cited

U.S. PATENT DOCUMENTS

| 7,801,521 B2 * | 9/2010 | Dent ................ H04B 7/18506 342/57 |
|---|---|---|
| 2008/0274734 A1 * | 11/2008 | Kostanic ............ H04B 7/18508 455/431 |
| 2011/0275376 A1 | 11/2011 | Boldi et al. |

(Continued)

FOREIGN PATENT DOCUMENTS

| CN | 101176367 A | 5/2008 |
| CN | 102217409 A | 10/2011 |

(Continued)

OTHER PUBLICATIONS

International Search Report and Written Opinion from International Application No. PCT/US2017/033499 dated Aug. 23, 2017, all enclosed pages cited.

(Continued)

*Primary Examiner* — Wei Zhao
(74) *Attorney, Agent, or Firm* — Burr & Forman LLP

(57) ABSTRACT

A base station within a network for providing ATG wireless communication in various cells may include a first antenna array, a base station unit and a remote radio head disposed between the base station unit and the first antenna array. The first antenna array defines a plurality of first sectors having respective widths defined in azimuth. Each of the first sectors includes a first sector floor and a first sector ceiling at respective elevation angles such that combining first sector floors and first sector ceilings creates at least a portion of a respective first base station conical cell centered at the first base station. The first base station is configured to define additional first base station conical cells at respective elevation angles between the first sector floor and the first sector ceiling. The remote radio head receives location information indicative of a location of an aircraft to enable the remote radio head to form a steerable beam in both azimuth and elevation angle at the first antenna array toward the aircraft.

20 Claims, 5 Drawing Sheets

Related U.S. Application Data

(60) Provisional application No. 62/339,229, filed on May 20, 2016.

(51) Int. Cl.
  *H04W 16/30* (2009.01)
  *H04W 88/08* (2009.01)

(56) References Cited

U.S. PATENT DOCUMENTS

| | | |
|---|---|---|
| 2014/0200045 A1 | 7/2014 | Jalali et al. |
| 2014/0274075 A1 | 9/2014 | Hyslop et al. |
| 2015/0223079 A1 | 8/2015 | Hyslop et al. |
| 2015/0358070 A1 | 12/2015 | Ohm |
| 2016/0119938 A1 | 4/2016 | Frerking et al. |
| 2017/0187414 A1* | 6/2017 | Talty .................. H04B 1/1036 |

FOREIGN PATENT DOCUMENTS

| | | |
|---|---|---|
| CN | 103354979 A | 10/2013 |
| CN | 105230048 A | 1/2016 |
| WO | 2015/038591 A1 | 3/2015 |

OTHER PUBLICATIONS

Communication pursuant to Article 94(3) EPC issued in corresponding European application No. 17728005.4 dated Sep. 16, 2019, all enclosed pages cited.
Office Action in related CN application No. 201780040066.5 dated Oct. 10, 2020, all pages cited in its entirety.
Office Action in related EP application No. 17728005.4 dated Oct. 30, 2020, all pages cited in its entirety.

* cited by examiner

VIRTUAL CONCENTRIC CELLS BASED ON ACTIVE ANTENNAS IN A WIRELESS COMMUNICATION SYSTEM

CROSS-REFERENCE TO RELATED APPLICATIONS

This application is a continuation of U.S. application Ser. No. 16/302,715 filed on Nov. 19, 2018 which is a U.S. National Phase application of International application PCT/US2017/033499 filed on May 19, 2017 which claims priority to U.S. provisional application No. 62/339,229 filed May 20, 2016, the entire contents of which are hereby incorporated by reference.

TECHNICAL FIELD

Example embodiments generally relate to wireless communications and, more particularly, relate to employing active antennas to provide continuous wireless communication at various distances and altitudes in communication cells that are virtually concentric.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based wireless communications systems use vertical antennas to provide coverage for device connectivity concentrated near the ground. However, aircraft operate in three dimensional space that extends far above the ground. Thus, it can be appreciated that significant changes would be needed to be able to provide three dimensional coverage for aircraft up to cruising altitudes as high as 45,000 ft.

BRIEF SUMMARY OF SOME EXAMPLES

The continuous advancement of wireless technologies offers new opportunities to provide wireless coverage for aircraft at varying elevations using multiple antennas installed at certain sites.

In one example embodiment, a network for providing air-to-ground (ATG) wireless communication in various cells is provided. The network includes a first base station and a second base station. The first base station may include a first antenna array defining a plurality of first sectors having respective widths defined in azimuth. Each of the first sectors may include a first sector floor and a first sector ceiling at respective elevation angles such that combining first sector floors and first sector ceilings creates at least a portion of a respective first base station conical cell centered at the first base station. The first base station may be configured to define additional first base station conical cells at respective elevation angles between the first sector floor and the first sector ceiling. The second base station may include a second antenna array defining a plurality of second sectors having respective widths defined in azimuth. Each of the second sectors may include a second sector floor and a second sector ceiling at respective elevation angles such that combining second sector floors and second sector ceilings creates at least a portion of a respective second base station conical cell centered at the second base station. The second base station may be configured to define additional second base station conical cells at respective elevation angles between the second sector floor and the second sector ceiling. The first base station and the second base station may be disposed to be located offset from each other along a first direction. A steerable beam is formable within each of the first sectors and second sectors. The steerable beam may be steerable both in azimuth and elevation angle based on beamsteering performed at respective ones of a first remote radio head and a second remote radio head of the first base station and the second base station.

In another example embodiment, a base station within a network for providing ATG wireless communication in various cells is provided. The base station may include a first antenna array, a base station unit and a remote radio head disposed between the base station unit and the first antenna array. The first antenna array may define a plurality of first sectors having respective widths defined in azimuth. Each of the first sectors may include a first sector floor and a first sector ceiling at respective elevation angles such that combining first sector floors and first sector ceilings creates at least a portion of a respective first base station conical cell centered at the first base station. The first base station may be configured to define additional first base station conical cells at respective elevation angles between the first sector floor and the first sector ceiling. The remote radio head may receive location information indicative of a location of an aircraft to enable the remote radio head to form a steerable beam in both azimuth and elevation angle at the first antenna array toward the aircraft.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
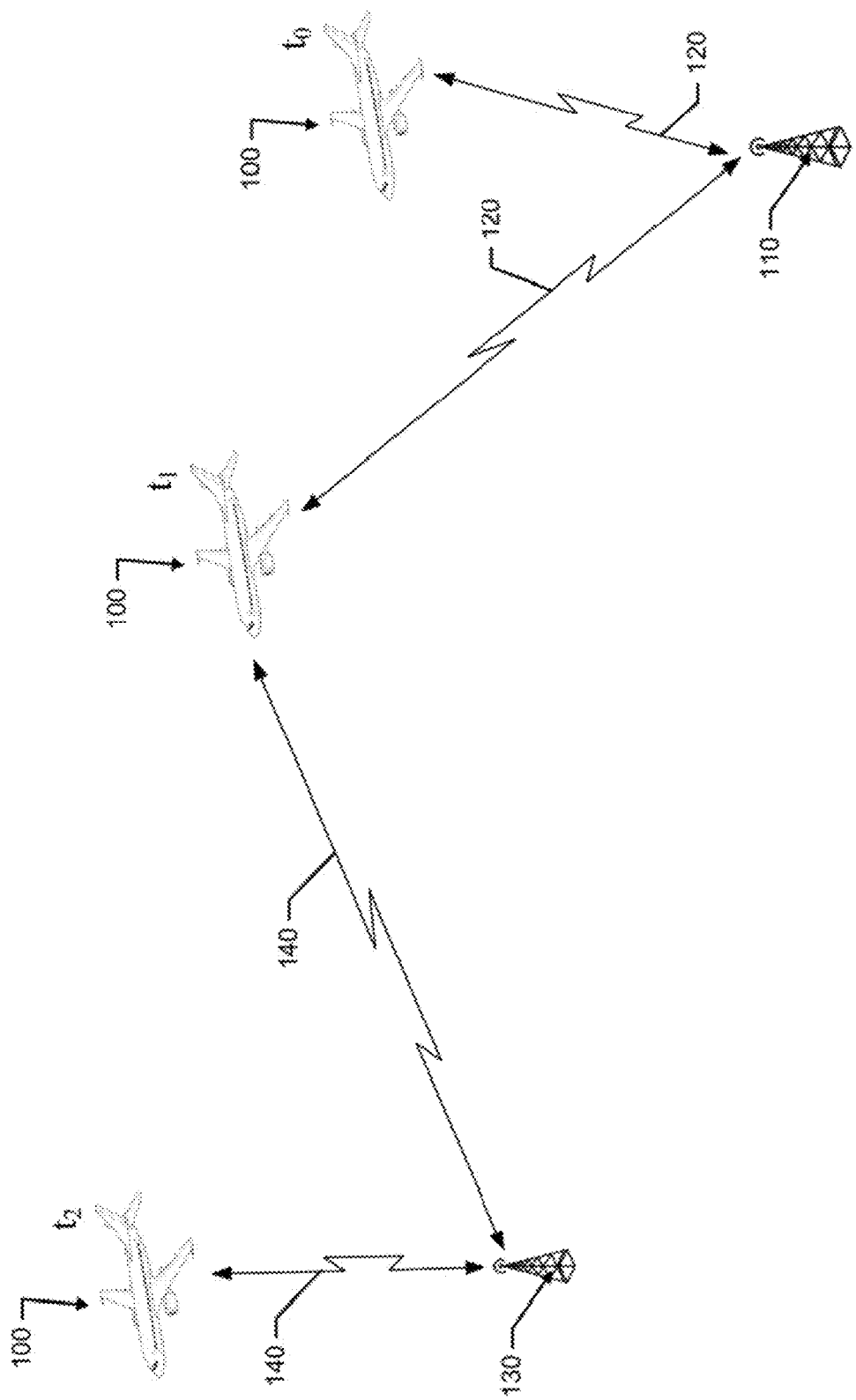
FIG. 1 illustrates an aircraft moving through the coverage areas of different base stations over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In some example embodiments, a plurality of antennas at a base station can form individual sectors (in azimuth) that can be combined to achieve semicircular (or circular) coverage areas around the base station. The sectors can also be defined between two elevation angles to define a wedge shaped coverage area or cell that extends away from the base station between the two elevation angles. Within each sector, steerable beams may be formed, and the beams can be steered in both azimuth and elevation within the sector. The steerable beams also have azimuth and elevation widths that define the size of the steerable beams. Thus, each of the beams can be swept in azimuth at a constant elevation angle within its respective sector to define the curved surface of a portion of a cone having its apex at the base station. Of note, the curved surface may technically have a wedge shape as well since it extends between elevation angles defining the height of the steerable beam. Considering multiple sectors, a beam could be swept around the base station at the same elevation angle to define the cone shape (or portion thereof depending on how many sectors the beam was swept through). The cone shape defined would generally have a radius much longer than the height of the cone (e.g., nearly the length of the sides of the cone shape). Since the beams are steerable in elevation as well, a concentric curved surface can also be swept at different elevation angles over the range of azimuths within one or more sectors to define slightly different and concentric cone shapes (or portions thereof). Thus, the steering capability may allow virtual concentric cells to be formed where each "cell" defines a conical surface (or portion thereof) bounded between two elevation angles and sweeping through a range of azimuths. Moreover, multiple such cells may be defined between corresponding adjacent (or at least different) ranges of elevation angles. These virtual concentric cells may be created using active antenna technology that allows steering intelligence to be moved closer to or into the antenna to further reduce the number of cables that need to run between a remote radio head (RRH) and the antennas of the base station.

Accordingly, some example embodiments described herein may provide architectures for improved air-to-ground (ATG) wireless communication performance. In this regard, some example embodiments may provide for base stations having antenna structures that facilitate providing wireless communication coverage in vertical and horizontal directions with sufficient elevation to communicate with aircraft at high elevations. A base station can provide a wedge shaped coverage area in which steerable beams can be steered to achieve coverage at a predetermined altitude within a predetermined distance from the base station to facilitate ATG wireless communications. The wedge shaped coverage area can be substantially semicircular (or circular) in the horizontal plane, and can be provided by multiple antennas each providing a wedge shaped sector over a portion of the semicircular azimuth. The base stations can be deployed as substantially aligned in a first direction while offset in a second direction. For example, the base stations can also be deployed in the first direction at a first distance to provide coverage overlapping in elevation to achieve coverage over the predetermined altitude, and within a second distance in the second direction based on an achievable coverage area distance of the sectors. The steerable beams may be steerable in both azimuth and elevation angle to allow virtual concentric cells to be defined. The virtual concentric cells are defined between elevation angle limits as concentric cones (or portions thereof) that are centered at and extend away from the base stations aimed just above the horizon. By providing the virtual concentric cells to extend toward the horizon, the coverage area above any particular base station may not be provided by that base station. Instead, an adjacent base station may provide coverage above each individual base station in order to reduce the possibility of interference from ground based emitters since the aircraft can look to the horizon for service instead of directly below, where the majority of interferers within range would be expected to be located.

FIG. 1 illustrates a conceptual view of an aircraft moving through a coverage zone of different base stations to illustrate an example embodiment. As can be seen in FIG. 1, an aircraft 100 may be in communication with a first base station (BS) 110 at time to via a first wireless communication link 120. The aircraft 100 may therefore include wireless communication equipment onboard that enables the aircraft 100 to communicate with the first BS 110, and the first BS 110 may also include wireless communication equipment enabling communication with the aircraft 100. As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the first wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the first wireless communication link 120.

A second BS 130, which may have similar performance and functional characteristics to those of the first BS 110, may be located geographically such that, for the current track of the aircraft 100, the second BS 130 is a candidate for handover of the aircraft 100 to maintain a continuous and uninterrupted communication link between the aircraft 100 and ground-based base stations of an ATG wireless communication network at time $t_1$. It may be helpful for the second BS 130 to be aware of the approach of the aircraft 100 so that the second BS 130 can employ beamforming techniques to direct a beam toward the aircraft 100. Additionally or alternatively, it may be helpful for the aircraft 100 to be aware of the existence and location of the second BS 130 so that the wireless communication equipment on the aircraft 100 may employ beamforming techniques to direct a beam toward the second BS 130. Thus, at least one of the second BS 130 or the wireless communication equipment on the aircraft 100 may employ beamforming techniques assisted by knowledge of position information to facilitate establishment of a second wireless communication link 140 between the wireless communication equipment on the aircraft 100 and the second BS 130. Thereafter, by time t2, the first communication link 120 may be dropped and the aircraft 100 may only be served by the second BS 130 via the second wireless communication link 140. In some cases, the handover between the first BS 110 and the second BS 130 may be a hard handoff managed from the ground side of the ATG wireless communication network.

Figure 2:
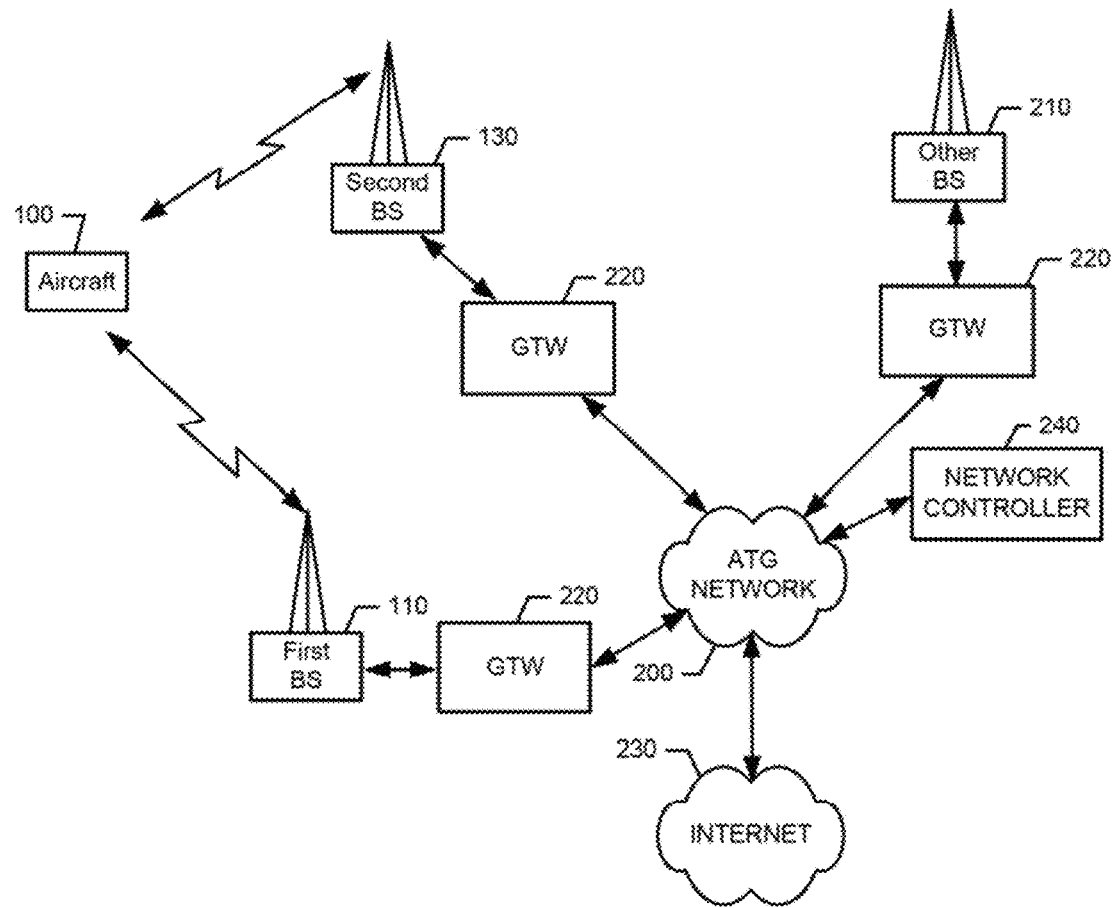
FIG. 2 illustrates a block diagram of a system for employing positional information for assisting with beamforming in accordance with an example embodiment.

In accordance with an example embodiment, a beamforming control module may be provided that employs knowledge of position information regarding a receiving station on an aircraft or ground stations to assist in application of beamforming techniques. Of note, beamforming techniques in accordance with some example embodiments may include selection of one of a plurality of fixed beams, where the selected fixed beam is aimed at the desired location. Thus, beam steering or beamforming should be understood to also encompass selection of a fixed beam having a desired orientation or projection pattern (e.g., beam selection). In any case, one or more instances of the beamforming control module of an example embodiment may be physically located at any (or all) of a number of different locations within an ATG communication network. FIG. 2 illustrates a functional block diagram of an ATG communication network that may employ an example embodiment of such a beamforming control module at the remote radio head proximate to the antenna array of a base station.

As shown in FIG. 2, the first BS 110 and second BS 130 may each be base stations of an ATG network 200. The ATG network 200 may further include other BSs 210, and each of the BSs may be in communication with the ATG network 200 via a gateway (GTW) device 220. The ATG network 200 may further be in communication with a wide area network such as the Internet 230 or other communication networks. In some embodiments, the ATG network 200 may include or otherwise be coupled to a packet-switched core network.

In an example embodiment, the ATG network 200 may include a network controller 240 that may include, for example, switching functionality. Thus, for example, the network controller 240 may be configured to handle routing calls to and from the aircraft 100 (or to communication equipment on the aircraft 100) and/or handle other data or communication transfers between the communication equipment on the aircraft 100 and the ATG network 200. In some embodiments, the network controller 240 may function to provide a connection to landline trunks when the communication equipment on the aircraft 100 is involved in a call. In addition, the network controller 240 may be configured for controlling the forwarding of messages and/or data to and from the mobile terminal 10, and may also control the forwarding of messages for the base stations. It should be noted that although the network controller 240 is shown in the system of FIG. 2, the network controller 240 is merely an exemplary network device and example embodiments are not limited to use in a network employing the network controller 240.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the communication equipment on the aircraft 100 via the Internet 230.

Although not every element of every possible embodiment of the ATG network 200 is shown and described herein, it should be appreciated that the communication equipment on the aircraft 100 may be coupled to one or more of any of a number of different networks through the ATG network 200. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. However, licensed band communication, such as communication in a frequency band dedicated to ATG wireless communication, may also be supported.

As indicated above, a beamforming control module may be employed on wireless communication equipment at either or both of the network side or the aircraft side in example embodiments. Thus, in some embodiments, the beamforming control module may be implemented in a receiving station on the aircraft (e.g., a passenger device or device associated with the aircraft's communication system). In some embodiments, the beamforming control module may be implemented in the network controller 240, at one or more of the base stations, or at some other network side entity. Moreover, in some example embodiments, beamforming may be accomplished by providing location/position information at the RRH of the base stations to enable active antenna beamforming as described herein.

Figure 3:
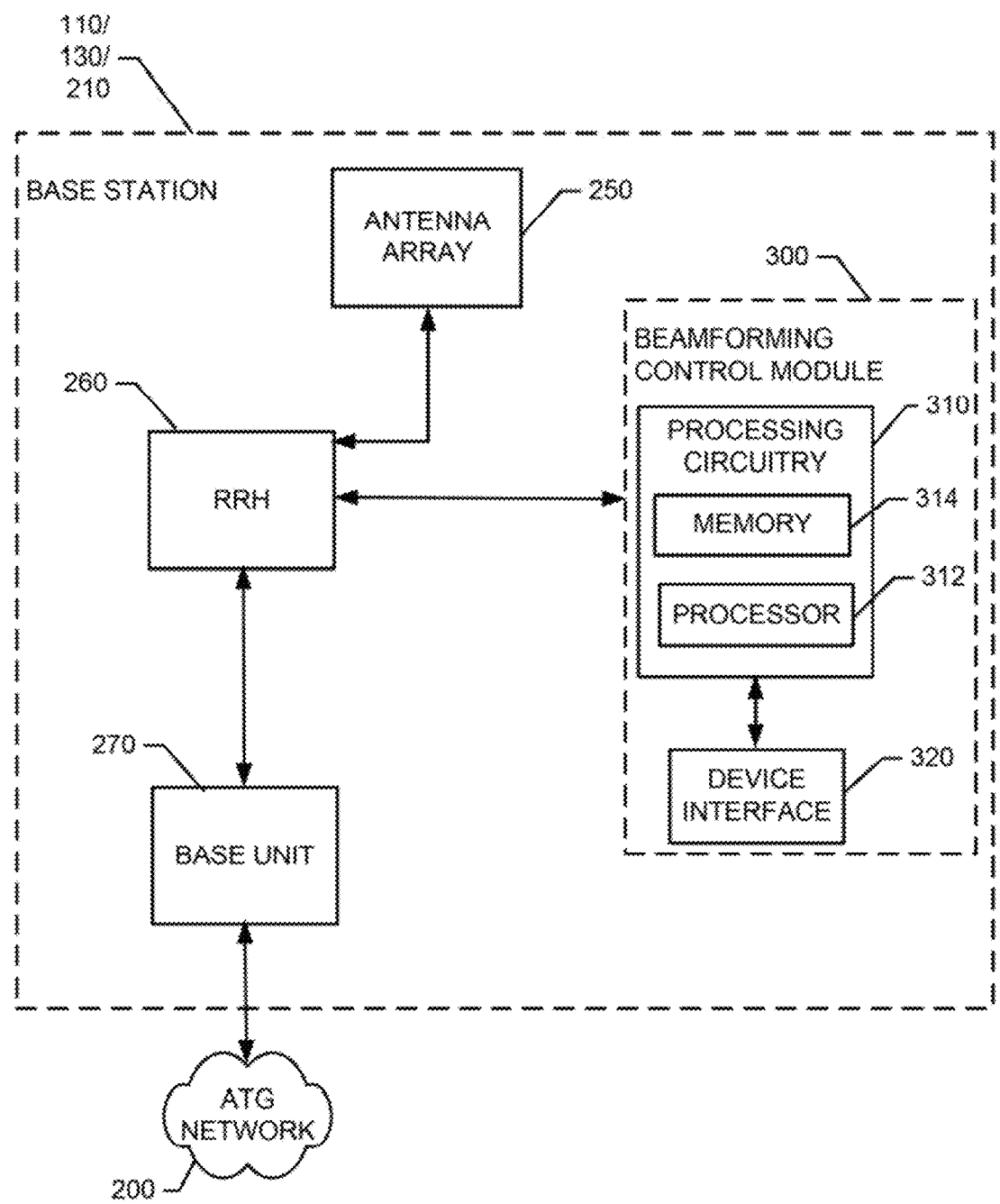
FIG. 3 illustrates control circuitry that may be employed to assist in using positional information for assisting with beamforming at the remote radio head according to an example embodiment.

FIG. 3 illustrates the architecture of a base station (e.g., BS 110, BS 130 or BS 210) employing a beamforming control module 300 in accordance with an example embodiment. As shown in FIG. 3, the base station may include an antenna array 250, a remote radio head (RRH) 260 and a base unit 270. The base unit 270 may include power supply, backhaul connectivity, and various signal processing and other processing capabilities typically associated with a base station. In a typical situation, the base unit 270 may be operably coupled to the antenna array 250 to interact with the antenna array 250 to receive inbound signals therefrom and to direct the antenna array 250 relative to beam formation for creating communication links with in-flight aircraft (e.g., aircraft 100). However, in a typical situation, the base station may also include a tower or mast that can be relatively high. Thus, to the extent that the transmitter is located in the base unit 270, high transmission capacity would need to be provided between the base unit 270 and the antenna array 250 via cabling extending as far as several hundred feet. To minimize the cable lengths, the RRH 260 may be provided.

The RRH 260 may include RF circuitry and analog-to-digital and/or digital-to-analog converters. The RRH 2260 may also include up/down converters and have operational and management capabilities (as discussed below in greater detail). In some cases, the RRH 260 further includes a high-frequency transmitter, and the RRH 260 is provided proximate to the antenna array 250. Thus, the length of high-frequency transmission lines between the RRH 260 and the antenna array 250 can be relatively short. This allows increased efficiency of the base station and reduces the cost associated with expensive and long cables. Meanwhile, a power cable and a data cable (and a control cable if needed) can be provided to operably couple the RRH 260 and the base unit 270. In some cases, the power cable and data cable can be combined into a single hybrid cable.

In an example embodiment, the beamforming control module 300 may be embodied in processing circuitry at the RRH 260. The beamforming control module 300 may use location information (or position information) indicative of the location of the aircraft 100 (in relative or absolute terms) to direct the antenna array 250 to form a beam directed toward the aircraft 250. As such, the beamforming control module 300 may interact with the antenna array 250 via the RRH 260 so that the RRH 260 is informed as to where the aircraft 100 is located to allow the RRH 260 to tell the antenna array 250 which specific beam to form to reach the aircraft 100. Moreover, the beamforming control module 300 may be configured to form the beams to have a limited width in both azimuth and elevation angle, and the beams may be steered in both azimuth and elevation.

Example embodiments may therefore place at least some of the intelligence associated with beamforming at or closer to (or at) the antenna. This means that, for example, an antenna assembly formed from eight vertically polarized antennas would typically require eight coaxial cables between the RRH 260 and the antenna assembly 250 to serve eight corresponding columns of elements. However, by shifting the provision of amplitude and phase information associated with beamforming closer to the antenna in the form of a logical control element, the antenna essentially becomes an active antenna and, for example, three cables instead of eight could be employed between the RRH 260 and antenna assembly 250 of an example embodiment to support the same beamforming efforts since one such cable (e.g., a control cable) can indicate where the beam should be steered both horizontally (i.e., in azimuth) and vertically (i.e., in elevation angle) and a physical switch is not needed.

The beamforming control module 300 may include processing circuitry 310 configured to provide control outputs for generation of beams at the antenna array 250 disposed the base station based on processing of various input information. The processing circuitry 310 may be configured to perform data processing, control function execution and/or other processing and management services according to an example embodiment. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 200.

The device interface 320 may include one or more interface mechanisms for enabling communication with other devices (e.g., modules, entities, sensors and/or other components of the base station). In some cases, the device interface 320 may be any means such as a device or circuitry embodied in either hardware, or a combination of hardware and software that is configured to receive and/or transmit data from/to modules, entities, sensors and/or other components of the base station that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to example embodiments while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the beamforming control module 300 based on inputs received by the processing circuitry 310 responsive to receipt of position information associated with various locations or relative positions of the communicating elements of the network. As such, in some embodiments, the processor 312 (or the processing circuitry 310) may be said to cause each of the operations described in connection with the beamforming control module 300 in relation to adjustments to be made to antenna arrays to undertake the corresponding functionalities relating to beamforming responsive to execution of instructions or algorithms configuring the processor 312 (or processing circuitry 310) accordingly. For example, the instructions may include instructions for processing 3D position information of a moving receiving station (e.g., on the aircraft 100) along with 2D position information of fixed transmission sites in order to instruct the antenna array 250 to form a beam in a direction that will facilitate establishing a communication link between the moving receiving station and one of the fixed transmission stations as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with example embodiments. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the beamforming control module 300 for directing the antenna assembly 250 to form a beam in a particular direction as described herein.

In an example embodiment, the memory 314 may store position information such as, for example, fixed position information indicative of a fixed geographic location of one or more base stations or dynamic position information indicative of a three dimensional position of the aircraft 100. The processing circuitry 310 may be configured to determine an expected relative position of the aircraft 100 based on the fixed position information and/or the dynamic position information and provide information to the antenna array 250 to direct formation of a beam based on the expected relative position of the aircraft 100 (or simply based on the position information). In other words, the processing circuitry 310 may be configured to utilize information indicative of the locations of aircraft determine where to point a beam for establishing a communication link to the aircraft. Tracking algorithms may be employed to track dynamic position changes and/or calculate future positions based on current location and rate and direction of movement of the aircraft 100 to facilitate keeping the beam on the aircraft 100. The beamforming control module 300 may therefore enable the RRH 260 to act as a control device (proximate to the antenna assembly 250) that is configured to adjust characteristics of the antenna array 250 to form directionally steerable beams steered in the direction of the expected relative position. Such steerable beams may, for example, have azimuth and elevation angle widths of 5 degrees or less. Moreover, in some cases, such steerable beams may have azimuth and elevation angle widths of 2 degrees or less. However, larger sized steerable beams may also be employed in some embodiments.

In an example embodiment, the dynamic position information may include latitude and longitude coordinates and altitude to provide a position in 3D space. In some cases, the dynamic position information may further include heading and speed so that calculations can be made to determine, based on current location in 3D space, and the heading and speed (and perhaps also rate of change of altitude), a future location of the aircraft 100 at some future time. In some cases, flight plan information may also be used for predictive purposes to either prepare assets for future beamforming actions that are likely to be needed, or to provide planning for network asset management purposes. The dynamic position information may be determined by any suitable method, or using any suitable devices. For example, the dynamic position information may be determined using global positioning system (GPS) information onboard the aircraft 100, based on triangulation of aircraft position based on a direction from which a plurality of signals arrive at the aircraft 100 from respective ones of the base stations, using aircraft altimeter information, using radar information, and/or the like, either alone or in combination with each other.

Figure 4:
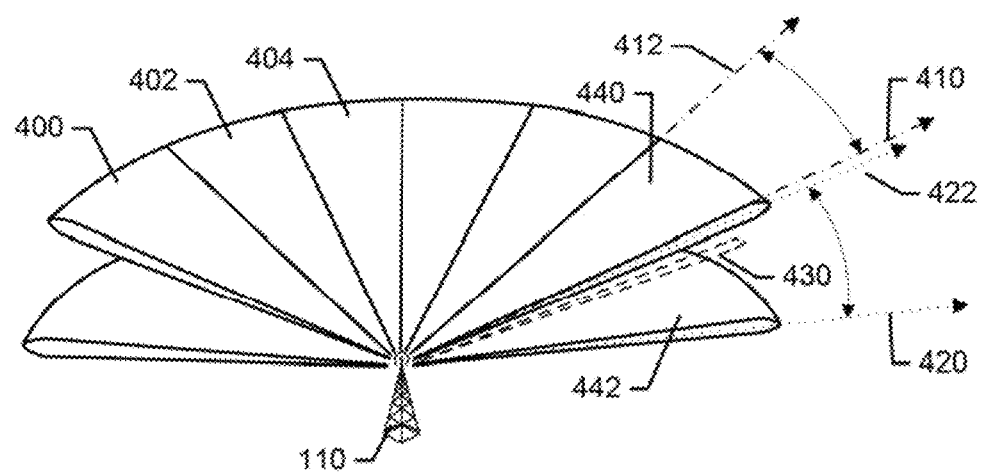
FIG. 4 illustrates a perspective view of coverage areas generated by a base station of an example embodiment.

The structure shown in FIG. 3 may be employed to generate steerable beams in azimuth and elevation within sectors defined around a base station. Moreover, example embodiments may form beams that are configured to have a relatively long range (e.g., greater than 100 km) and may be generally aimed just above the horizon. This ensures that communications between base stations and aircraft are not conducted such that the aircraft communicates with ground stations nearby or below the aircraft. Such ground stations would tend to be located proximate to interference sources that could also reach the aircraft. However, by focusing long range beams from a base station toward the horizon to an aircraft, and by focusing beams similarly back toward the base station from the aircraft, interference can be significantly reduced. The resulting coverage areas or communication cells formed around the base stations therefore may have a wedge shape as the coverage areas extend away from the base stations just above the horizon. In some cases, these coverage areas may further be defined by sectors. FIG. 4 illustrates a perspective view of coverage areas (e.g., sectors) generated by a base station of an example embodiment The BS 110 of FIG. 4 employs a plurality of antenna elements that form the antenna array 250 of FIG. 3. The antenna elements may be grouped to form individual sectors (e.g., first sector 400, second sector 402, third sector 404, etc.). Each sector may be defined between azimuth boundaries and elevation angle boundaries. Thus, for example, one of the sectors may extend between a first azimuth 410 and a second azimuth 412 and between a first elevation angle 420 and a second elevation angle 422. The width of the azimuth boundaries may determine the number of sectors that are needed to provide the desired amount of coverage around the BS 110. For example, if each of the sectors has a width of thirty degrees in azimuth, then six sectors would be required to provide 180 degrees of coverage on one side of the BS 110. Likewise, if circular or 360 degree coverage was desired, then twelve sectors of thirty degrees would be required. The example of FIG. 4 shows a semicircular coverage area with six thirty degree wide sectors in azimuth.

The sectors are defined between two azimuths to define a triangular or pie shaped sector profile in the vertical plane, and are defined between two elevation angles to define a wedge shaped profile in the vertical plane. Within each of the sectors, a steerable beam 430 may be formed, and the steerable beam 430 can be steered in both azimuth and elevation within the sector. The steerable beam 430 may have azimuth and elevation widths as small as five degrees, or even two degrees, to define the size of the steerable beam 430. However, in some cases, the beams may have different sizes depending upon the channel for which the steerable beam 430 is generated. For example, if the channel is configured as a control channel, the steerable beam 430 may have a size that is at least three or four times larger than the size of the steerable beam 430 when the steerable beam 430 is configured as a traffic channel.

If the steerable beam 430 is swept in azimuth from the first azimuth 410 to the second azimuth 412 at the second elevation angle 422, then sector ceiling 440 is traced as shown in FIG. 4. Meanwhile, if the steerable beam 430 is swept in azimuth from the first azimuth 410 to the second azimuth 412 at the first elevation angle 422, then sector floor 442 is traced as shown in FIG. 4. The entire space between the sector ceiling 440 and the sector floor 442 is eligible space in which the steerable beam 430 for the corresponding sector 400 can be steered.

As can be appreciated from FIG. 4, the sector ceiling 440 and sector floor 442 each define a curved surface of a portion of a cone having its apex at the BS 110. Of note, the curved surfaces may technically each have a wedge shape as well since it extends between elevation angles defining the height of the steerable beam 430. Considering multiple sectors, a beam could be swept around the base station at the same elevation angle to define the cone shape (or portion thereof depending on how many sectors the steerable beam 430 is swept through). The cone shape defined would generally have a radius much longer than the height of the cone. In this regard, the cone height may be on the order of 10 to 15 km, while the radius may be in excess of 100 km (e.g., to perhaps greater than 200 km).

Since the steerable beam 430 is steerable vertically (e.g., in elevation) as well as horizontally (e.g., in azimuth), a concentric curved surface can also be swept at each different elevation angle over the range of azimuths within one or more sectors 400 to define concentric cone shapes (or portions thereof) with different angles. Thus, the steering capability may allow virtual concentric cells to be formed where each "cell" defines a conical surface (or portion thereof) bounded between two elevation angles (i.e., the elevation angle limits of the steerable beam 430 itself, and not the sector ceiling and floor limits) and sweeping through a range of azimuths. Moreover, multiple such cells may be defined between corresponding adjacent (or at least different) ranges of elevation angles.

For example, all of the sector ceilings of the sectors may combine to define a cell ceiling. If the cell ceiling extends around the entire BS 110 over 360 degrees, the cell ceiling forms a cone shape having its apex at the BS 110. Meanwhile, if all sector floors are combined, a cell floor may be defined as a cone having its apex at the BS 110 as well. The cell floor and the cell ceiling may each appear as concentric cone shaped "cells" with a plurality of cone shaped cells having slightly different elevation angles formed in between the cell floor and the cell ceiling. As can be appreciated from the description above, if the sectors only cover 180 degrees around the BS 110, then all of the sector floors and sector ceilings, and each cell traced in between at a given elevation angle, will define a half cone. The half cones will again be concentric about the BS 110. As discussed above, these virtual concentric cells are created using active antenna technology that allows steering intelligence to be moved closer to or into the antenna to further reduce the number of cables that need to run between the RRH 260 and the antennas of the base station.

In the example above, the beamforming control module 300 generates the steerable beam 430 (which may be a selection of a fixed beam) based on having aircraft location information provided to the RRH 260. However, in other cases, a time division approach could be employed to search for the aircraft 100 using sector search techniques. The sector search techniques may include cycling through activation of steerable beams until the aircraft is located. Thus, for example, within a sector, steerable beams may be sequentially formed (e.g., tracing out the ceiling sector or floor sector and each other concentric cell in sequence) until the aircraft 100 is located. In any case, the processing for beam steering may be performed at the RRH 260 so that less cabling and active antenna technology can be employed for more efficient beam forming.

Figure 5:
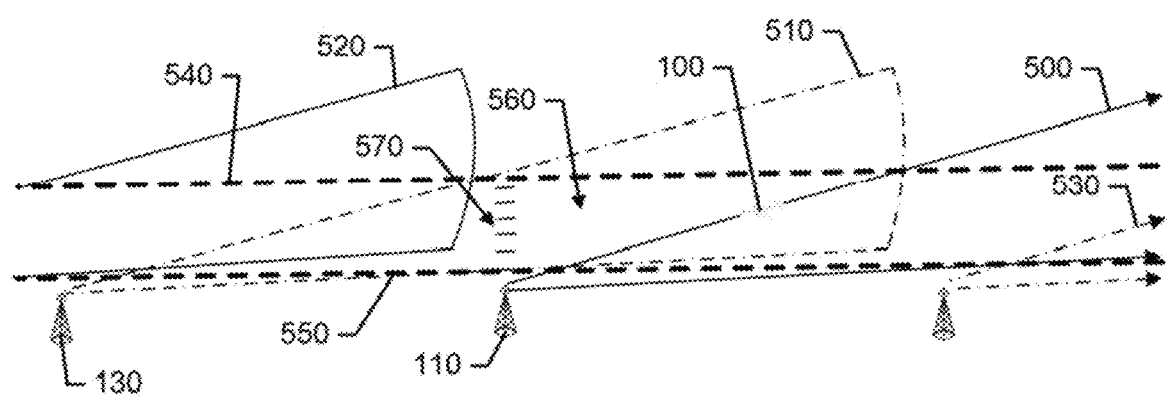
FIG. 5 illustrates a side view of a network topology for deploying base stations to provide ATG wireless communications in accordance with an example embodiment.

In an example embodiment, the virtual concentric cells formed by the BS 110 are projected toward and slightly above the horizon. Thus, the BS 110 essentially provides coverage over the top of another BS, while still another BS provides coverage over the top of the BS 110. FIG. 5 illustrates the resulting coverage scheme if the BSs are assumed to generally align along a direction (e.g., a cardinal direction). However, it should be appreciated that other BSs will also be aligned in rows spaced apart from (and generally running parallel to) the BSs shown in FIG. 5 on opposite sides of the BSs shown in FIG. 5. It should also be appreciated that FIG. 5 is not drawn to scale. In this regard, the distances between BSs are very large (e.g., greater than 100 km), and the altitudes of coverage (although large in practical terms) are relatively small by comparison (e.g., on the order of 10 to 15 km at most).

As shown in FIG. 5, the aircraft 100 is at time $t_1$, where a transition between BS 110 and BS 130 can occur. A first coverage area 500 that is generated from BS 110 is shown to extend over other BS 210, while a second coverage area 510 is generated from BS 130 to extend over BS 110. A third coverage area 520 is generated by a BS that is not visible, and the third coverage area 520 extends over the BS 130. The other BS 210 also generates its own coverage area (i.e., a fourth coverage area 530). Of note, frequency bands employed by adjacent BSs may be different to facilitate interference mitigation.

As can be appreciated from FIG. 5, the coverage areas overlap each other and are generally wedge shaped (in cross section). A coverage area ceiling 540 may be defined at a predetermined altitude at which continuous coverage can be defined by the overlapping coverage areas. The coverage area ceiling 540 may be defined at (or near) the lowest altitude at which coverage areas define continuous coverage based on overlapping of sector ceilings with the maximum coverage range of an adjacent cell. Similarly, a coverage area floor 550 may be defined at (or near) the highest altitude at which coverage areas define continuous coverage based on overlapping of sector floors of adjacent cells. The space between the coverage area floor 550 and the coverage area ceiling 540 is an operating area 560 inside which the aircraft 100 can be served by the BSs (e.g., via handovers) on a continuous and uninterrupted basis.

As shown in FIG. 5, directly above BS 110, as altitude increases all coverage is provided by a distally located BS (e.g., BS 130). Moreover, each respective virtual concentric cell defined by BS 130 extending from the sector floor of the BS 130 to the sector ceiling of the BS 130 defines a corresponding increasing altitude band from the coverage area floor 550 to the coverage area ceiling 540. A plurality of such altitude bands 570 is shown in FIG. 5 so it can be appreciated that different conical cells (or portions thereof) are formed with each respective one of the altitude bands 570 by vertically steerable beams.

Accordingly, some example embodiments described herein may provide architectures for improved ATG wireless communication performance. In this regard, some example embodiments may provide for base stations having antenna structures that facilitate providing wireless communication coverage in vertical and horizontal directions with sufficient elevation to communicate with aircraft at high elevations. The base stations employ active antenna technology by providing aircraft position information at the remote radio head so that beamforming intelligence is implemented as close as possible to the antennas themselves. As a result, each base station provides a wedge shaped coverage area in which steerable beams can be steered, both vertically and horizontally, to achieve overlapping coverage between a maximum predetermined altitude and a minimum predetermined altitude within a predetermined distance from the base station. The virtual concentric cells formed by the base stations are defined between elevation angle limits as concentric cones (or portions thereof) that are centered at and extend away from the base stations aimed just above the horizon to minimize interference.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A remote radio head of a base station within a network for providing air-to-ground (ATG) wireless communication in various cells, the remote radio head including a beamforming control module comprising:
    a device interface; and
    processing circuitry configured to receive location information indicative of a location of an aircraft to enable the remote radio head to control a steerable beam in both azimuth and elevation angle toward the aircraft,
    wherein the remote radio head and beamforming control module are disposed between an antenna array of the base station and a base unit of the base station such that the device interface enables the beamforming control module to communicate with the base unit and the antenna array, and
    wherein the device interface comprises a single control cable enabling the processing circuitry to control the steerable beam.

2. The remote radio head of claim 1, wherein the single control cable provides information to the antenna array regarding phase and amplitude information associated with directing the antenna array to control the steerable beam.

3. The remote radio head of claim 2, wherein the single control cable provides information to the antenna array regarding horizontal steering of the steerable beam in azimuth and vertical steering of the steerable beam in elevation angle.

4. The remote radio head of claim 2, wherein the device interface further comprises a single power cable and a single data cable between the antenna array and the remote radio head.

5. The remote radio head of claim 1, wherein the remote radio head receives information indicative of the location of the aircraft from an external source.

6. The remote radio head of claim 1, wherein the remote radio head is configured to cycle through a range of azimuth and elevation angles within each of a plurality of sectors of the antenna array to determine the location of the aircraft.

7. The remote radio head of claim 6, wherein each of the sectors comprises respective widths defined as a range of azimuths, and respective heights defined between a sector floor and a sector ceiling at respective elevation angles.

8. The remote radio head of claim 1, wherein the antenna array comprises a plurality of sectors,
    wherein each of the sectors comprises respective widths defined as a range of azimuths, and respective heights defined between a sector floor and a sector ceiling at respective elevation angles to define a range of elevation angles, and
    wherein the beamforming control module is configured to form a specific beam inside the range of azimuths and the range of elevation angles based on the location of the aircraft.

9. The remote radio head of claim 8, wherein the steerable beam is steered by sequentially forming the specific beam to reach the aircraft as the aircraft moves within a respective one of the sectors within the range of azimuths and the range of elevation angles based on the location of the aircraft.

10. The remote radio head of claim 1, wherein the remote radio head is located at a top of a tower supporting the antenna array and proximate to the antenna array.

11. A base station within a network for providing air-to-ground (ATG) wireless communication in various cells, the base station comprising:
    a base unit operably coupled to an ATG network;
    an antenna array configured to wirelessly communicate with an aircraft; and
    a remote radio head including a beamforming control module configured to receive location information indicative of a location of the aircraft to enable the remote radio head to control a steerable beam in both azimuth and elevation angle toward the aircraft,
    wherein the remote radio head and the beamforming control module are disposed between the antenna array and the base unit of the base station, and
    wherein the remote radio head comprises a single control cable enabling the remote radio head to control the steerable beam.

12. The base station of claim 11, wherein the single control cable provides information to the antenna array regarding phase and amplitude information associated with directing the antenna array to control the steerable beam.

13. The base station of claim 12, wherein the single control cable provides information to the antenna array regarding horizontal steering of the steerable beam in azimuth and vertical steering of the steerable beam in elevation angle.

14. The base station of claim 12, wherein the device interface further comprises a single power cable and a single data cable between the antenna array and the remote radio head.

15. The base station of claim 11, wherein the remote radio head receives information indicative of the location of the aircraft from an external source.

16. The base station of claim 11, wherein the remote radio head is configured to cycle through a range of azimuth and elevation angles within each of a plurality of sectors of the antenna array to determine the location of the aircraft.

17. The base station of claim 16, wherein each of the sectors comprises respective widths defined as a range of azimuths, and respective heights defined between a sector floor and a sector ceiling at respective elevation angles.

18. The base station of claim 11, wherein the antenna array comprises a plurality of sectors,
- wherein each of the sectors comprises respective widths defined as a range of azimuths, and respective heights defined between a sector floor and a sector ceiling at respective elevation angles to define a range of elevation angles, and
- wherein the beamforming control module is configured to form a specific beam inside the range of azimuths and the range of elevation angles based on the location of the aircraft.

19. The base station of claim 18, wherein the steerable beam is steered by sequentially forming the specific beam to reach the aircraft as the aircraft moves within a respective one of the sectors within the range of azimuths and the range of elevation angles based on the location of the aircraft.

20. The base station of 11, wherein the remote radio head is located at a top of a tower supporting the antenna array and proximate to the antenna array.

* * * * *